Nov. 11, 1969   M. PAULL   3,477,780
AUDIO-VISUAL APPARATUS
Filed Jan. 13, 1967   3 Sheets-Sheet 1
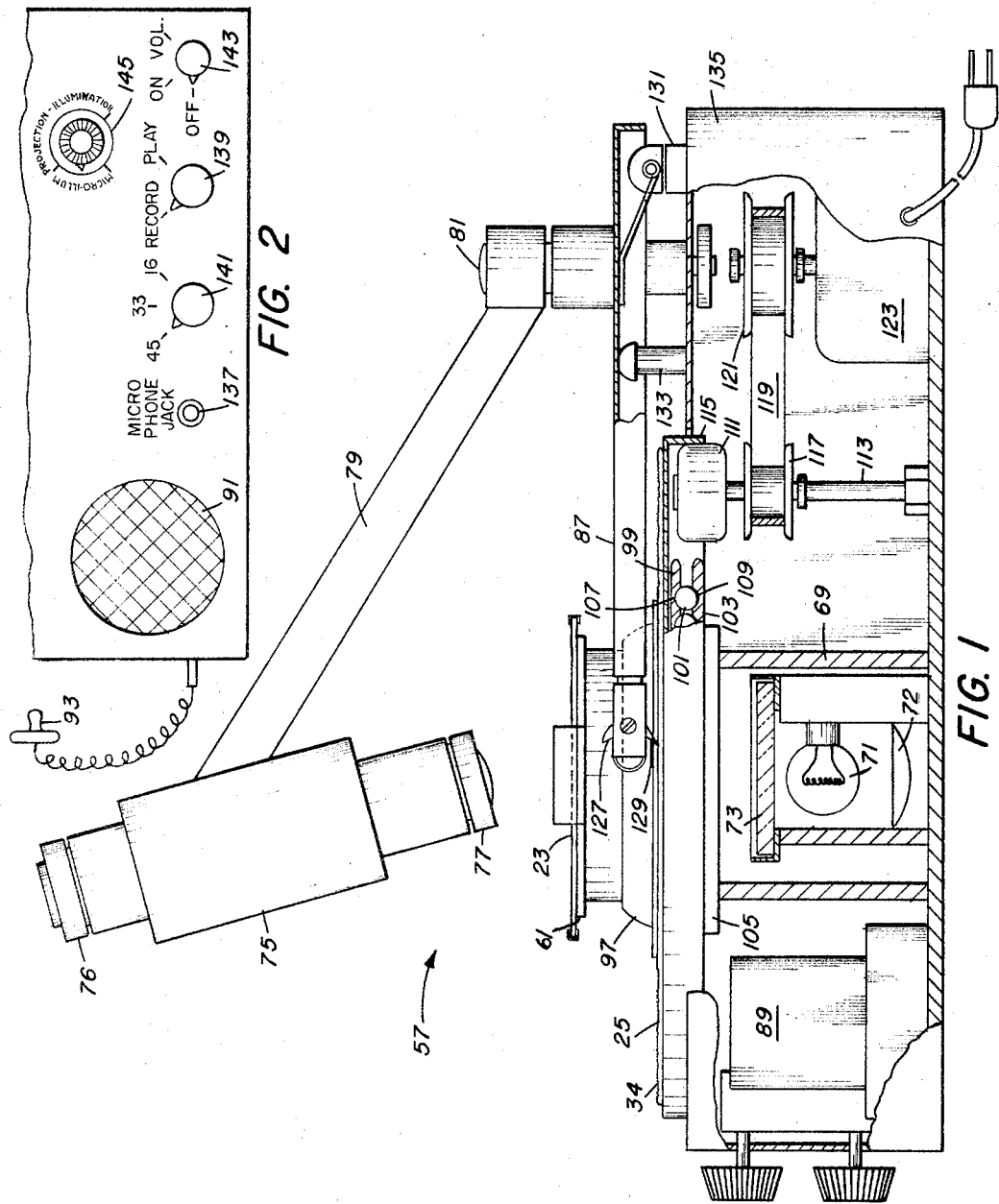

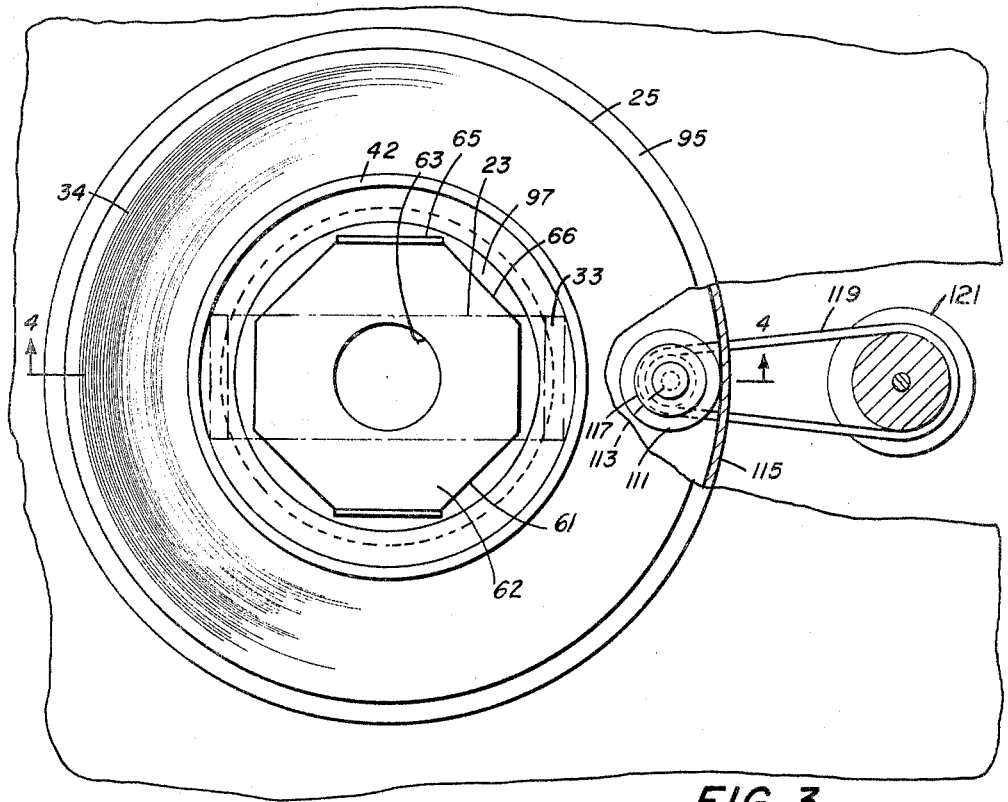
FIG. 3
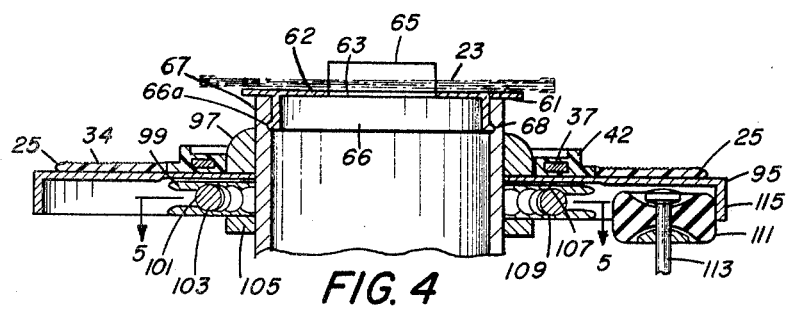
FIG. 4
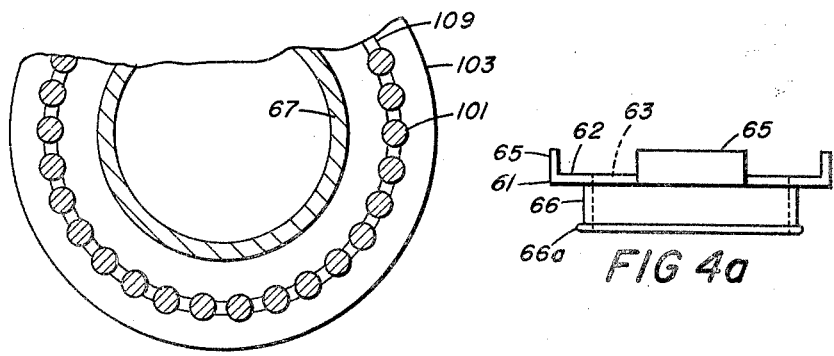
FIG. 5
FIG 4a

> United States Patent Office 3,477,780
Patented Nov. 11, 1969

3,477,780
AUDIO-VISUAL APPARATUS
Morris Paull, Brighton, N.Y., assignor to Chemtrox Corporation, Rochester, N.Y., a corporation of New York
Filed Jan. 13, 1967, Ser. No. 609,122
Int. Cl. G03b 31/06
U.S. Cl. 353—16                                      14 Claims

ABSTRACT OF THE DISCLOSURE

A separable slide-sound record device having magnets mounted in the record member for holding the slide and record together. The slide member has a visual area containing material to be observed visually and the sound record member has a sound track for producing audible information related to the visual material on the slide member. An audio-visual apparatus is also provided for viewing a scene on a slide while listening to a description of the scene. The audio-visual apparatus has a stationary stage, a turntable, a sound pick-up arm and optical and illumination components. The stationary stage provides a slide supporting surface and a window for the passage of light therethrough. The turntable has its axis coincident with the center of the window and rotates the record. The sound recorded on the record is reproduced by the pick-up arm and electrical apparatus. The illumination component is provided on one side of the stationary stage for passing light through the window. The optical component is provided on the other side of the stage for viewing a scene when a slide is in position on the stage.

BACKGROUND OF THE INVENTION

In the U.S. Patent No. 3,270,614, to Paull there is disclosed a picture slide and annular sound record construction which comprises a hub on which the sound record is slidably mounted and to which the picture slide is frictionally secured.

In the U.S. patent, No. 3,245,312, to Paull there is disclosed an apparatus adapted to receive the picture slide and sound record construction of the 3,270,614 patent, and to turn the record while holding the picture slide in a fixed position with a light source on one side of the slide and an optical projection system on the other side of the slide.

While the picture slide-sound record construction and the apparatus of these two patents work reasonably well, on occasion under normal use conditions, particularly when either or both of the sound record and hub is or are warped, sufficient friction is developed between the rotating record and the relatively stationary hub so as to interfere with the rotation of the record. The loss in fidelity of the sound being reproduced is noticeable and can be bothersome, particularly when there is a "wow" effect.

An object of this invention is to provide a picture slide-sound record construction that avoids this disadvantage.

Another object of this invention is to provide a generally improved and more satisfactory picture slide-sound record construction.

Still another object of this invention is to provide apparatus adapted to receive the generally improved and more satisfactory picture slide-sound record construction of this invention, and to provide a view of the slide scene while reproducing with high fidelity the sound on the record without interference with the rotation of the record.

Yet another object of this invention is to provide a generally improved and more satisfactory apparatus of this type.

BRIEF DESCRIPTION OF THE DRAWINGS

In the drawings, which are of a material part of the disclosure:

FIG. 1 is a side view of a preferred specific embodiment of an audio-visual apparatus of this invention, in which view part of the exterior structure has been removed to reveal interior structure;

FIG. 2 is a front view of the lower portion of the specific apparatus of FIG. 1;

FIG. 3 is a plan view of a portion of the apparatus of FIG. 1, in which view part of the outer structure has been removed to reveal inner structure;

FIG. 4 is a sectional view of a portion of the apparatus of FIG. 1, which view has been taken as indicated by the sectioning plane 4—4 in FIG. 3;

FIG. 4a is a side view of another embodiment of an interchangeable part in the apparatus of FIG. 1;

FIG. 5 is another sectional view, being taken as indicated by the sectioning plane 5—5 in FIG. 4;

DESCRIPTION OF PREFERRED EMBODIMENTS

Figure 6:
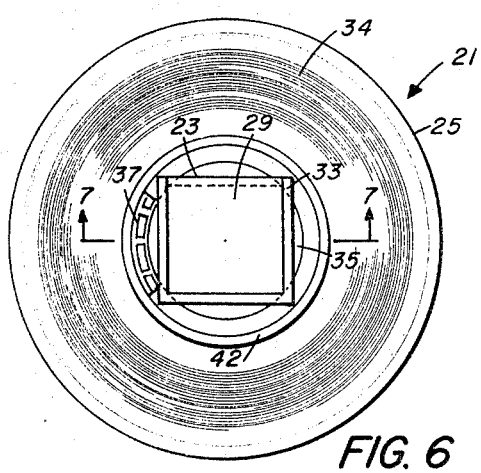
FIG. 6 is a plan view of a preferred specific embodiment of a microscope slide-sound record construction of this invention, in which view a portion of the outer structure of the record member of the construction has been removed to reveal inner structure.
Figure 7:
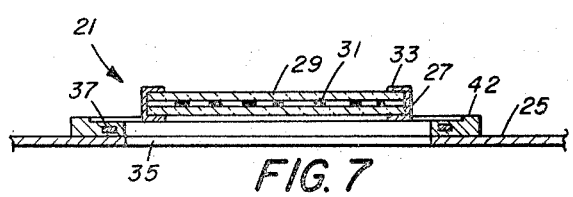
FIG. 7 is a cross sectional view of the construction in FIG. 6, which view has been taken as indicated by the sectioning plane 7—7 in FIG. 6.
Figure 15:
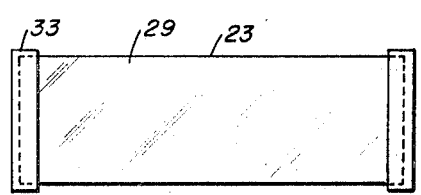
FIG. 15 is a plan view of the slide member in another preferred specific embodiment of a microscope slide-sound record construction of this invention.
Figure 16:
FIG. 16 is a somewhat exaggerated front side view of the slide member of FIG. 15.

Referring to the drawings in greater detail, FIGS. 6-7 illustrate a slide-sound record construction 21 comprising a microscope slide member 23 and a sound record member 25. In this embodiment the microscope slide member 23 comprises a flat transparent base plate 27 and a flat transparent cover plate 29 with one or more specimens 31 sandwiched in between. The base plate 27 and cover plate 29 are held together marginally in a frame 33. In the embodiment shown, the frame 33 is made out of magnetically susceptible material, i.e., it is magnetically attracted. In other embodiments, it is made out of magnetically polarized material, i.e., it is magnetized. The microscope slide member can have the general shape and frame structure as shown in FIGS. 6 and 7. Alternatively, it can have the general shape and frame structure shown in FIGS. 15 and 16 wherein the base plate is of the usual shape involved in microscope slides. While in FIGS. 6–7 and 15–16 the cover plate 29 is shown as commensurate in size with the base plate, it can be of the usual cover slip size, shape and thickness, particularly when the specimen 31 is small as, for example, a smear.

The sound record member 25 is of conventional construction and shape, except for the center portion thereof which comprises a central opening or aperture 35 therethrough. The central aperture 35 is of sufficient size and shape to accommodate a stationary, slide retaining stage on the axis of a rotatable record turntable in the audio-visual apparatus with which the slide-sound record construction 21 is intended to be used. Arranged in a ring around the central aperture 35 are a plurality of arcuate magnets 37 with the adjacent ends of the magnets 37 being of preferably opposite magnetic polarity and spaced from one another. Preferably the magnets 37 are surrounded by material out of which the record member 25 is formed. Such material, of course, cannot be a magnetic insulator or shield.

Figure 8:
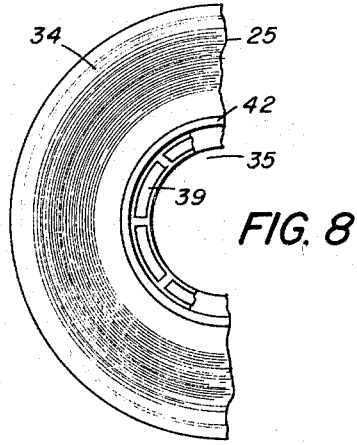
FIG. 8 is a plan view of one-half of a symmetrical sound record member in another preferred specific embodiment of a slide-sound record construction of this invention, in which view an outer portion of the record member has been removed to reveal underlying structure.

In the embodiment of FIG. 8, the record member 25 comprises in the region of the central aperture 35 a pair of substantially semi-circular magnets 39 with the adjacent ends being of preferably opposite magnetic polarity and spaced from one another. Preferably the semi-circular magnets 39 are surrounded by the non-magnetic material out of which the record member 25 is formed.

Figure 9:
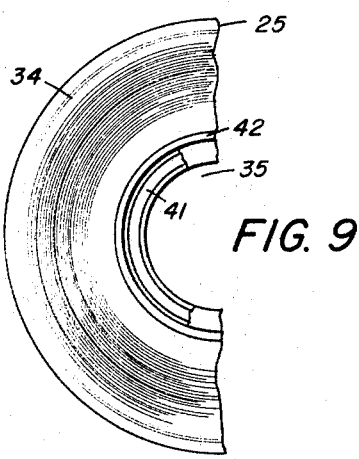
FIG. 9 is a plan view of one-half of a symmetrical sound record member in still another preferred specific embodiment of a slide-sound record construction of this invention, in which view part of the exterior structure has been removed to reveal underlying structure.

In the embodiment of FIG. 9 the record member 25 comprises in the region of the central aperture 35 a continuous ring 41 of magnetically polarized material. The ring is preferably magnetized axially. Here also it is preferred that the ring 41 be surrounded by non-magnetic material out of which the record member 25 is formed.

In each of these three embodiments of the sound record member 25 there preferably is an axially outwardly projecting slide centering ring 42 on the grooved side of the record. This ring presents an axially facing, cylindrical, slide centering surface at a radius preferably slightly greater than the maximum radius of the ring in which the magnets 37, 39 and 41 in each embodiment are disposed. The inside radius of the centering ring 42 is such that the slide member 23, when in position on the sound record member 25, is in proper position relative to the central aperture 35 with preferably substantially very little play between the corners of the slide member 23 and the inside circumference of the slide centering ring 42.

Although in the embodiments of FIGS. 6–9 it is intended that the slide member 23 have a magnetically susceptible frame 33, in other embodiments the frame 33 is magnetized. In such case the record member 25 can have the magnets 37, 39 or 41, or in lieu of the magnets it can have only magnetically attracted elements corresponding in size and shape to the magnets 37, 39 or 41. In all of the embodiments of the slide-record construction of this invention the magnetic forces involved are preferably sufficient to hold the two members together against the weight of the heavier member when the slide member is in the position desired on the record member, but yet small enough so that the two members can be deliberately pulled apart by hand preferably by a child without an undue amount of effort. Preferred magnetic forces are such that a separating force the equivalent of about one pound of added weight applied to the heavier member when the construction is suspended by the lighter member, both being horizontal, is all that is needed to separate the two members. Of course, greater and smaller magnetic forces are within the broader concepts of this invention.

Figure 10:
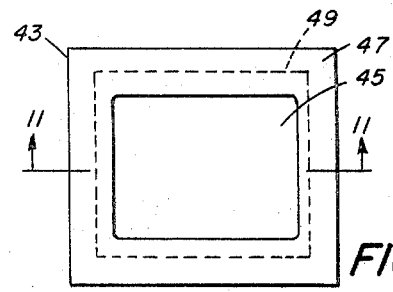
FIG. 10 is a plan view of a picture slide member of a preferred specific embodiment of a picture slide-sound record construction of this invention.
Figure 11:
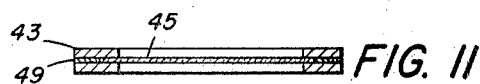
FIG. 11 is a cross sectional view of the picture slide member of FIG. 10, which view has been taken as indicated by the sectioning plane 11—11 in FIG. 10.
Figure 12:
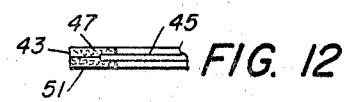
FIG. 12 is a cross sectional view of a marginal portion of a picture slide member in another preferred specific embodiment of a picture slide-sound record construction of this invention.

In the embodiments of FIGS. 10–14 the slide member is a picture slide 43 which in each case comprises a photographic transparency 45 and a transparency mount 47 that forms a rectangular frame around the transparency 45. The transparency mount 47 is of the usual construction, except that in the embodiment of FIGS. 10–11 it comprises a magnetically susceptible wafer 49 rectangular in plan view and having a rectangular aperture for accommodating the photographic transparency. In the embodiment of FIG. 12 the transparency mount 47 is composed essentially of a mixture of cellulose fiber material and magnetically susceptible fibrous material, while in the embodiment of FIG. 13 the transparency mount 47 is composed essentially of a mixture of cellulose fiber material and finely divided magnetically susceptible material. In both embodiments the proportion of magnetically susceptible material present is sufficient to hold by magnetic attraction the picture slide member 43 within the slide centering ring 42 on the sound record member 25.

Figure 14:
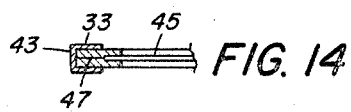
FIGURE 14 is a cross sectional view of a marginal portion of a picture slide member in yet another preferred specific embodiment of a picture slide-sound record construction of this invention.

In the embodiment of FIG. 14 the transparency mount 47 is conventional, but the picture slide 43 further comprises the frame 33, the structure and composition of which is described above in conjunction with the microscope slide member 23.

Figure 13:
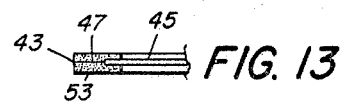
FIG. 13 is another cross sectional view of a marginal portion of a picture slide member in still another preferred specific embodiment of a picture slide-sound record construction of this invention.

Again, in other embodiments the picture slide 43, instead of the magnetically susceptible wafer in the embodiment of FIGS. 10 and 11, or the magnetically susceptible fibrous and finely divided material in the embodiments of FIGS. 12 and 13, or the magnetically susceptible frame 33, can comprise a magnetized wafer 49, frame 33 or magnetized fibers and/or a finely divided material.

FIGS. 1–5 illustrate an audio-visual apparatus 57 comprising a microscope portion and a sound reproduction portion.

The microscope portion (see FIG. 1) comprises a stage or table structure, an illumination assembly and an optical assembly.

The stage structure (see FIGS. 3 and 4) comprises a removable platform 61 which has a generally flat, normally horizontal slide supporting surface 62 with a central window 63. The central window 63 is preferably round with the center thereof being on a normally vertically oriented reference axis. Although not necessary, the removable platform 61 can also comprise as in the embodiment shown a pair of oppositely disposed, normally vertically extending side flanges 65. The side flanges 65 are useful when microscope slide member 23 has the shape of the slide member in FIGS. 6–7. In such case in the embodiment shown the side flanges 65 center the slide member 23 laterally without restricting it longitudinally (relative to the apparatus). Hence, the slide member can be repositioned longitudinally on the platform 61 so as to position a desired portion of a slide specimen in the field of the microscope over the window 63. Of course, instead of the side flanges 65 being transversely disposed as in FIGS. 1, 3 and 4, they can be longitudinally disposed so as to center the slide member 23 longitudinally without restricting it laterally. This can be particularly desirable in those embodiments wherein the microscope tube can be moved longitudinally rather than laterally as in the embodiment shown.

When only picture slide members like that shown in FIGS. 10 and 11 are to be viewed, the removable platform can have the structure as shown in FIG. 4a. The structure comprises the slide supporting surface 62, but the area of the window 63 is sufficiently large to cover the entire area of the transparency 45 surrounded by the mount 47. In this structure, because normally the slide member 43 is rectangular in shape, indeed usually square in shape, there are preferably four slide centering flanges 65 and they are generally arranged as though at the sides of a rectangle which preferably is square.

In addition to the slide supporting surface the removable platform 61 (see FIGS. 4 and 4a) has a generally cylindrical skirt 66 that normally extends downwardly therefrom. The skirt in the embodiment shown has an outwardly projecting annular bead 66a.

The removable platform 61 (FIGS. 4 and 4a) is supported on a support column, the upper part of which comprises a hollow cylinder 67 (see FIG. 4) and the lower part of which comprises legs 69 (see FIG. 1). The cylindrical skirt 66 slidably fits within the hollow cylinder (see FIG. 4) which comprises on the inside thereof an annular groove 68 to receive the annular bead 66a on the skirt. Preferably in the embodiments shown the skirt 66 of the removable platform is sufficiently flexible so that the platform 61 can be snapped in and out of the hollow cylinder 67. The radius of the radially outermost parts of the platform 61 and cylinder 67 from the center line of the platform window 63 is sufficiently less than the inside radius of the central aperture 35 of the record member 25 that the pertinent portion of the stage structure can pass through the central aperture 35 of a sound record member 25.

The illumination assembly (see FIG. 1) is positioned within the lower part of the support column. It comprises a light source such as an electric projection bulb or lamp 71, a concave, mirror 72 normally underneath it and a heat absorbing light diffusion plate 73 above it. The light bulb 71, mirror 72 and the light diffusion plate 73, of course, are preferably centrally arranged relative to the normally vertically oriented reference axis of the stage structure.

The optical assembly (see FIG. 1) in this embodiment is conventional and, therefore, need not be described in detail. It comprises the usual microscope body or tube 75 with an eye piece 76 at the upper end and a objective lens structure 77 at the lower end. The microscope body 75 is secured to a support arm 79 mounted for rotation horizontally on a normally vertically disposed post 81. In the embodiment shown the microscope body 75 is immovably secured to the support arm 79. In another embodiment the means for securing the microscope body 75 to the support arm 79 comprise a hand operated adjusting screw for moving the microscope body 75 toward or away from the stage 61 when it is over the stage. In still another embodiment the microscope body 75 is immovably secured to the support arm 79 and the optical assembly includes a zoom lens system.

The sound reproduction portion of the audio-visual apparatus 57 comprises a turntable assembly in operative association with a turntable drive assembly, a sound pickup arm assembly, preferably an audio amplifier 89, and a speaker 91 as well as a plug-in type earphone 93.

The turntable structure comprises a round turntable 95 (see FIGS. 3 and 4) on a normally vertically disposed axis coincident with the reference axis. The turntable 95 has a central opening therethrough for the cylinder 67 of the stage support column. The top of the turntable is in a horizontally disposed plane which is spaced below the horizontally disposed plane of the stage 61. Surrounding the central opening is a normally upwardly extending sound record centering ring 97. The centering ring 97 at its base has an outside diameter slightly less than the diameter of the central aperture 35 of the sound record member 25. Preferably at least the upper outer portion of the centering ring 97 is curved radially inwardly so that a record member 25 on being lowered to the turntable 95 need not be precisely positioned, and, as it descends to the turntable 95, is automatically centered by the centering ring 97. The turntable 95 is supported on an upper annular bearing plate 99 which in turn is supported on movable ball bearings 101. The ball bearings are supported by a lower bearing plate 103 (see FIG. 5) secured to an annular flange 105 (see FIG. 4) extending laterally from the cylinder 67 of the stage support column. The ball bearings 101 (see FIGS. 4 and 5) are retained in a ring by an annular groove or race 107 in the upper bearing plate 99 and an annular groove or race 109 in the lower bearing plate 103.

The turntable drive asesmbly (see FIGS. 1 and 3) comprises a drive wheel 111 secured to a normally vertically positioned rotatable drive shaft 113. The drive wheel is positioned so that its periphery frictionally engages laterally a downwardly extending flange member 115 of the turntable 95. The vertical drive shaft 113 is rotated by a driven pulley 117 thereon engaged by a drive belt 119. The drive belt is also in engagement with a drive pulley 121 mounted on the shaft of a conventional electric motor 123.

The sound pickup arm assembly (see FIG. 1) in the embodiment shown is a conventional structure and, therefore, need not be described in detail. It comprises a sound pickup arm 87 with a dual function head that has a sound recording stylus 127 and a sound pick up stylus 129. The head is rotatable so as to present the sound recording stylus 127 to a sound record blank on the turntable 95, which it is desired to record, and to present the sound pickup stylus 129 to a sound record on which sound has already been recorded. In another embodiment, the sound pickup arm 87 has a single function head for use with an annular sound record member 25 of the permanent groove magnetic variety such as used in conjunction with the Rex recording dictation machine.

The sound pickup arm 87 is mounted on a mounting post 131 for horizontal as well as vertical movement. When not in use the sound pickup arm 87 normally and preferably is positioned laterally of the turntable 95 on a stationary support 133 (see FIG. 1).

The sound pickup arm 87 in the embodiment shown is manually operated; that is, it is manually moved from the stationary support 133 to the beginning of the record member 25, and from the end of the record member to the stationary support 133. However, in another embodiment structure and control means are provided so as to make such operation automatic. In still another embodiment structure and control means are provided which not only make such operation automatic when the pertinent control is set for such operation, but, when the pertinent control is set for continuous play condition and a second control is actuated, the sound pickup arm 87 is moved from the stationary support 133 to the beginning of the record member 25 and from the end of the record member to the beginning of the record member 25 and so on until the second control is again actuated, whereupon the sound pickup arm 87 is moved from whatever record playing position it happens to be in to the stationary support 133.

In one embodiment of this apparatus, not shown, the stage assembly comprises an electromagnet, the winding of which is energized whenever the sound pickup arm 87 is moved off the stationary support arm 133 and is de-energized whenever the sound pickup arm 87 is returned to the stationary support arm 133. This embodiment is particularly useful when the turntable is on a horizontally disposed axis of rotation, although it is not limited thereto. Of course, operation of the sound pickup arm 87 in this embodiment can be manual or automatic. In this embodiment no special effort need be expended to separate the record member 25 from the slide member when placing a slide-record construction 21 on the stage 61; the electromagnet accomplishes the separation when energized and brings the sound record member to the turntable.

The mounting post 131 and stationary support 133 for the sound pickup arm 87, and the mounting post 81 for the microscope body support arm 79 are positioned on top of a base cabinet 135 (see FIGS. 1 and 2). Within the cabinet are the illumination assembly, the turntable drive assembly, the audio amplifier 89, the speaker 91 and such other controls as are involved. The front of the cabinet 135 (see FIG. 2) is in the form of a control panel having an opening therein for the speaker 91 and an opening for a microphone jack 137. It comprises an opening for a rotatable switch 139 for switching the input and output of the audio amplifier 89 from a record condition (for example, input to microphone and output to sound pickup arm assembly) to a playback condition (for example, input to sound pickup arm assembly and output to speaker 91 or to earphone 93 in lieu of speaker 91 if the earphone 93 is plugged in). In addition it comprises an opening for a rotatable turntable speed selector switch 141, an opening for a rotatable on-off and volume control switch-potentiometer 143, and an opening for a rotatable illumination control potentiometer 145. For normal use with the optical assembly shown, the illumination control 145 is normally set at a value whereat the light emitted from the lamp 71 is at an illumination suitable for such use, but not generally enough for photographic purposes or for projection purposes. However, when it is desired to photograph through the optical assembly shown or other optical assembly a specimen mounted on the slide member 23 on the stage 61, the illumination control 145 can be turned so as to increase the amount of illumination to the desired extent.

The jack for the earphone plug is on one side of the cabinet and is wired to the speaker 91 in such a way that when the earphone plug is seated in the jack, the speaker is cut out. Such an electrical hook-up is conventional and well understood in the art.

To use the audio-visual apparatus of FIGS. 1–5, a slide-sound record construction 21 comprising a slide member 23 of the microscope slide type with specimens 31 mounted thereon, and a record member 25 with a recorded description thereon of the specimens 31, is positioned over the stage 61 with the slide member 23 and grooved side of the record member 25 facing upwardly. The slide-sound record construction 21 is then lowered past the stage 61 until the record member 25 is deposited on the turntable 95. As the record member 25 passes the stage 61, the slide member 23 is deposited on the stage and separation of the record member 25 from the slide member 23 is effected. In the event that the slide centering flanges 65 are not in alinement with the corresponding open spaces between the sides of the slide member 23 and the periphery of the central aperture 35 of the record member 25, the record member 25 is elevated sufficiently to lift the slide member 23 off the slide centering flanges 65, and then the record member 25 with the slide member 23 thereon is turned until the slide centering flanges 65 are in alinement with said spaces. Thereupon, the record member 25 is lowered to the turntable 95, leaving the slide member on the stage 61.

When it is desired to change from one slide-sound record construction to another slide-sound record construction, the sound pickup arm 87 is placed on the stationary support 133, the microscope body 75 on the swingable support arm 79 is moved to one side, and the record member 25 on the turntable 95 is lifted past the stage 61 and then moved laterally of the apparatus. As the record member 25 passes the stage 61, the slide member 23 is engaged by the record member 25 and is lifted upwardly from the stage. Because of the presence of the magnetically polarized and magnetically susceptible portions of the slide-sound record construction, upon removal of the slide-record construction from the apparatus, the record member 25 can be turned on its side without the slide member 23 falling off, and the slide-sound record construction can be handled and stored as a unit.

While the use of the audio-visual apparatus of FIGS. 1–5 has been described in relation to the magnetically held separable slide-sound record construction of this invention, it is useful with any slide-sound record construction having the same general structure, except for the magnetic and magnetizable members, wherein the slide is separable from the sound record by passing the sound record in alignment with the center of the stage past the platform to the turntable. Thus, it can be used with a separable slide-sound record construction wherein the slide and record members are frictionally held together. An example of such a construction comprises a record member with a resilient semi-flexible ring around the central aperture, and a separable slide member with corner portions that frictionally fit within the inside circumference of the ring. The apparatus can also be used with a separable slide-sound record construction wherein the slide and record members are adhesively held together. An example of such a construction comprises a record member with an annular tacky adhesive coating around the central aperture, and the slide member has no coating. In another example only the slide member has a tacky adhesive coating at least at one corner, preferably at two corners desirably diagonally opposite and most preferably at all four corners. In still another example both members have adhesive coating at these places and preferably the coatings have an adhesive affinity substantially only for each other, the adhesion being sufficiently strong to hold the members together under normal storage and transportation conditions, but weak enough so that the members can be separated preferably with the separating force described in connection with the magnetic forces involved in the magnetically held slide-sound record construction of this invention. Adhesives having this property of adhesive affinity substantially only for the same or similar adhesives are well known and, therefore, need not be further described herein. Of course, the audio-visual apparatus of this invention can be used for slides and records that exist independently from each other and which have to be individually placed into position on the apparatus. However, such are not preferred because they are not convenient, and mix-ups and losses can more readily occur.

Thus, there are provided a slide-sound record construction and a microscope type of audio-visual apparatus for reproducing the sound on the record member while viewing a scene (specimen or picture) on the slide member. The construction and apparatus have utility as educational tools. Their structures are inherently simple and rugged, making possible the use of the apparatu on a wide spread basis for individual instruction.

A feature of advantage of this invention is that under normal operative conditions the record member turns with the turntable without interference from the slide member.

Another feature of advantage of this invention is the unitary nature of the slide-record construction. In this construction the slide member and sound record member can be handled, transported and stored together as a unit. However, the slide member can be readily separated from the record member when desired and especially when using the slide-sound record construction in the audio-visual apparatus of this invention.

It is seen from the foregoing diclosures that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. Audio-visual apparatus comprising a slide member having a central visual area containing material to be observed and a marginal area surounding said central visual area, and a sound record member containing a sound track for producing audible information related to the visual material on said slide member, said sound record member having a central aperture of approximately the area of said central visual area of said slide member and normally alined therewith, said central aperture of said sound record member being smaller than the outer edges of said marginal area of said slide member so that when said slide member is in concentric axial alinement with said sound record member, said marginal area may rest on a portion of said sound record member around the central aperture thereof, and readily separable coupling means for holding said slide member and sound record member together in coupled relation to each other in concentric axial alinement with each other with sufficient force to prevent accidental axial separation from each other, said coupling means being so constructed that said members may be readily uncoupled and separated from each other by exerting reasonable force in an axial direction away from each other, to enable said slide member to be held stationary for visual observation while said sound record member is rotated during reproduction of sound recorded thereon, and said members may be readily recoupled to each other by simple axial movement toward each other until they are in contact with each other, whereupon they will again resist axial separation.

2. A construction as defined in claim 1, wherein said coupling means comprises magnetic means.

3. A construction as defined in claim 2, wherein said magnetic means includes magnetic material on at least one of said members, arranged approximately concentrically around the axis thereof.

4. A construction as defined in claim 1, wherein said coupling means comprises a tacky adhesive coating on at least one of said members.

5. A construction as defined in claim 1, wherein said coupling means comprises adhesive coatings having affinity for each other, arranged on the respective members in position so that the coating on one member will make contact with the adhesive coating on the other member when the two members are in normal coupled relation to each other.

6. A construction as defined in claim 1, further including a projecting rim on the sound record member for surrounding the edges of said slide member when the members are in normal coupled relation to each other, to prevent lateral displacement of the slide member relative to the sound record member.

7. Audio-visual apparatus for viewing a scene on a slide while listening to a description of said scene, which comprises:
  (a) relatively stationary stage means providing a stage having a substantially flat, slide supporting surface with a central window for the passage of light therethrough;
  (b) illumination means on one side of said stage for passing light through said window;
  (c) optical means on the other side of said stage for viewing said scene when said slide is in position on said stage
  (d) turntable means including a turntable rotatably mounted with its axis of rotation substantially coincident with the center of said window with the plane of the record supporting side of said turntable being axially spaced from the plane of the slide supporting surface of said stage;
  (e) means for rotating said turntable; and
  (f) means including sound pickup arm means for reproducing sound recorded on a record when in position on said turntable means.

8. Apparatus according to claim 7, wherein said plane of said slide supporting surface is normally horizontally disposed, said illumination means are below said stage, and said optical means are above said stage.

9. Apparatus according to claim 8, wherein said turntable means comprise centering means for centering said record on said turntable.

10. Apparatus according to claim 9, wherein said record has a round central aperture of size sufficient to accommodate said stage means when said record is lowered to said turntable and is lifted from said turntable, and said centering means comprise a centering ring member of said turntable.

11. Apparatus according to claim 10, wherein the outside radius of said centering ring member at least in the upper portion thereof in going downwardly on the axis of rotation of said turntable gradually increases from a minimum to a maximum that is slightly less than the radius of said central aperture of said record.

12. Apparatus according to claim 8, wherein said stage also comprises slide positioning means.

13. Apparatus according to claim 12, wherein said slide is rectangular and said slide positioning means include upwardly projecting flanges stationed adjacent to the center portion of the edges of said slide when in position on said stage.

14. Apparatus according to claim 13, wherein said optical means comprise a microscope body with eye piece means and objective lens means.

References Cited

UNITED STATES PATENTS

| | | |
|---|---|---|
| 2,147,482 | 2/1939 | Butler _____ 240—52.15 XR |
| 2,683,390 | 7/1954 | Steele. |
| 3,057,255 | 10/1962 | Bregman. |
| 3,159,078 | 12/1964 | Schwartz et al. |
| 3,208,340 | 9/1965 | Rom et al. |
| 3,270,614 | 9/1966 | Paull. |
| 3,296,925 | 1/1967 | Yamamoto. |

NORTON ANSHER, Primary Examiner

R. P. GREINER, Assistant Examiner

U.S. Cl. X.R.

40—70; 274—42